United States Patent [19]
Young et al.

[11] Patent Number: 5,859,851
[45] Date of Patent: Jan. 12, 1999

[54] PROGRAMMABLE BIT-COLLISION ADJUSTMENT CIRCUITRY FOR A BI-DIRECTIONAL SERIAL COMMUNICATION LINK

[75] Inventors: Paul M. Young, Peoria; Gregory L. Williamson, Metamora, both of Ill.

[73] Assignee: Caterpillar Inc., Peoria, Ill.

[21] Appl. No.: 631,482

[22] Filed: Apr. 12, 1996

[51] Int. Cl.$^6$ .................................................. H04L 12/413
[52] U.S. Cl. ........................ 370/447; 370/282; 370/519
[58] Field of Search ..................... 370/282, 294, 370/462, 507, 519, 517, 276, 280, 286, 447, 446, 448, 445; 327/261, 392, 553; 340/825.06, 825.61

[56] References Cited

U.S. PATENT DOCUMENTS

| | | | |
|---|---|---|---|
| 5,022,050 | 6/1991 | Tanaka | 375/219 |
| 5,046,063 | 9/1991 | LaGess | 370/294 |
| 5,418,486 | 5/1995 | Callahan | 327/310 |
| 5,568,474 | 10/1996 | Wissman | 370/294 |

*Primary Examiner*—Hassan Kizou
*Assistant Examiner*—Soon-Dong Hyun
*Attorney, Agent, or Firm*—Mario J. Donato, Jr.; W. Bryan McPherson, III; David M. Masterson

[57] ABSTRACT

A digital communication circuit that avoids bit collisions between an external communication device and a controller that communicate to each other through a bi-directional serial communication link is disclosed. The digital communication circuit includes digital circuitry that receives and transmits a digital communication signal. A detection circuit detects when a digital communication signal is being received. And delay circuitry receives the transmitted digital communication signal and responsively produces a delay signal to delay the detection of the received digital communication signal.

8 Claims, 3 Drawing Sheets

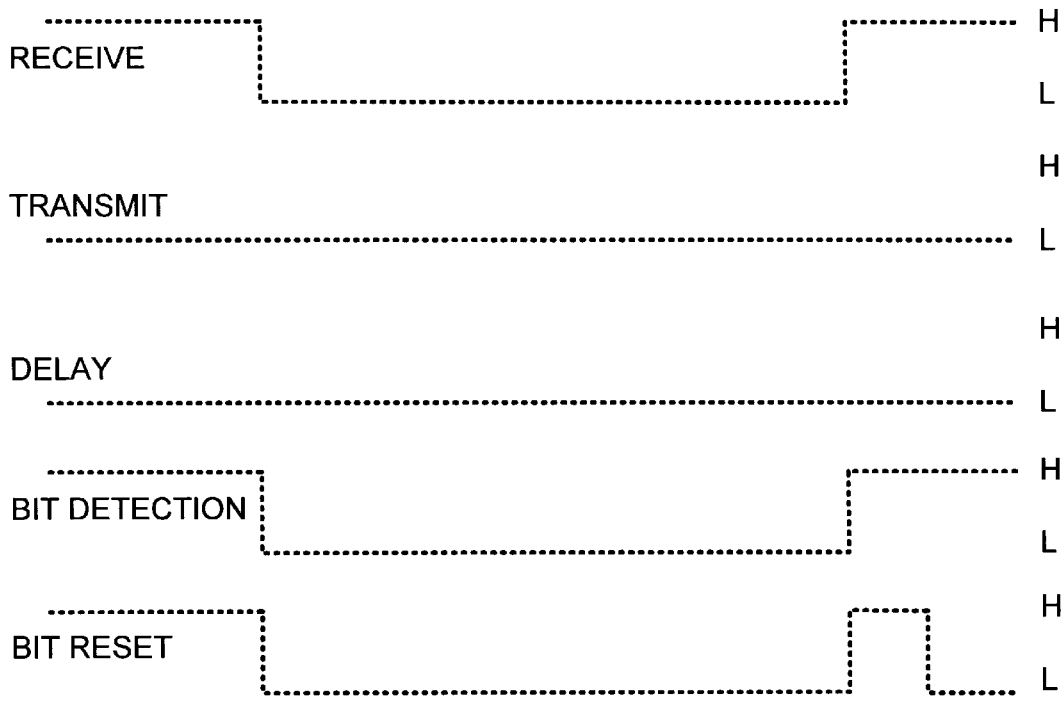
Fig-2-
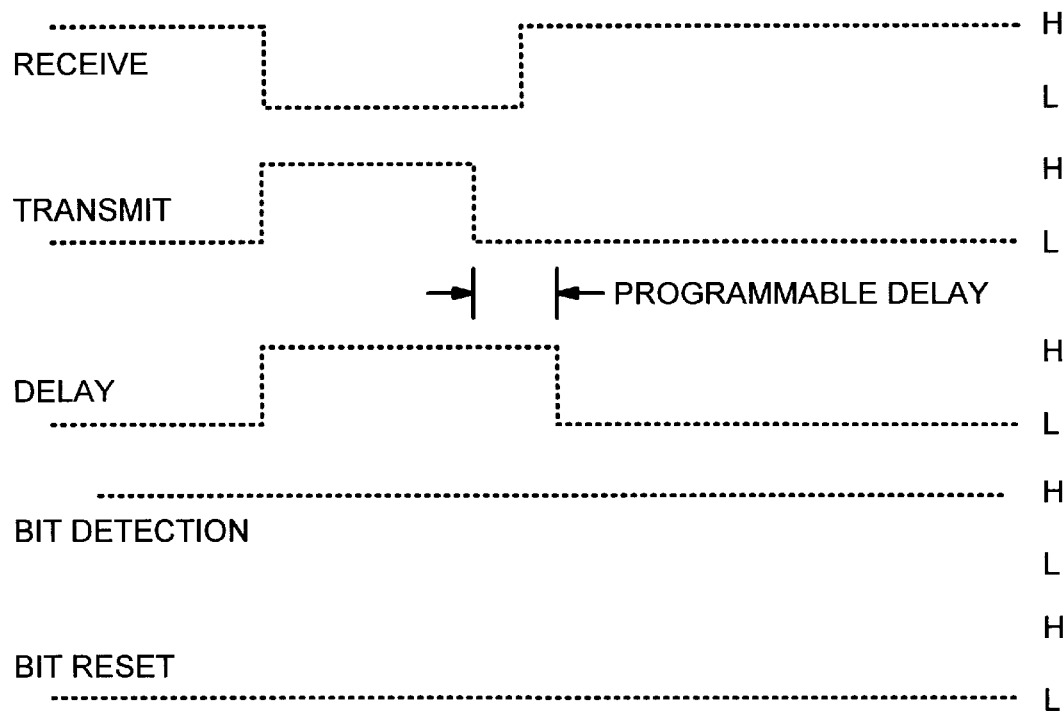
Fig-4-

5,859,851

PROGRAMMABLE BIT-COLLISION ADJUSTMENT CIRCUITRY FOR A BI-DIRECTIONAL SERIAL COMMUNICATION LINK

TECHNICAL FIELD

This invention relates generally to a bit-collision adjustment circuit for a bidirectional serial communication link and, more particularly, to a bit-collision adjustment circuit that accounts for signal transmission delay.

BACKGROUND ART

Digital communications have become increasingly common as digital control devices are used in controlling a wide range of consumer products from automobiles to washing machines. Typically, a microprocessor-based controller will communicate with an externally controlled device to carry out a function or to receive some information. The controller and controlled device send and receive data to the other via a single communication link cable.

However, communication problems may occur when the send and receive messages conflict with each other. This type of problem is commonly due to two characteristics of this type of communication. One characteristic pertains to the start time for a message. For example, neither communicator knows when the other is going to begin transmitting a new message. Thus, if both communicators attempt to send data to each other simultaneously, then a collision may occur which can destroy the integrity of the data. It is then desirable to detect when a communicator is receiving a message in order to delay the transmission of a subsequent message to avoid any collision.

A second characteristic pertains to the message delay associated with the baud rate of the data transmission and the length and/or load capacitance of the cable. For example, each communicator includes transmit and receive circuitry. When a message is transmitted from one communicator to another communicator, the receive circuitry of the transmitting communicator also detects its own transmissions after some measurable delay has passed. This delay is dependent upon the baud rate of the message and the load capacitance and/or the length of the cable. It is therefore important to avoid detecting a communicator's own delayed transmission because otherwise a false collision detection at that communicator would occur. Thus, it is desirable to account for the delay from the production of the transmission signal to the receipt of the delayed transmission signal in order to avoid false detections associated with that delay.

The present invention is directed toward overcoming one or more of the problems as set forth above.

DISCLOSURE OF THE INVENTION

In one aspect of the present invention, a digital communication circuit that avoids bit collisions between an external communication device and a controller that communicate to each other through a bi-directional serial communication link is disclosed. The digital communication circuit includes digital circuitry that receives and transmits a digital communication signal. A detection circuit detects when a digital communication signal is being received. And delay circuitry receives the transmitted digital communication signal and responsively produces a delay signal to delay the detection of the received digital communication signal.

BRIEF DESCRIPTION OF THE DRAWINGS

For a better understanding of the present invention, reference may be made to the accompanying drawings in which:

FIG. 2 shows a block diagram of a delay circuit associated with the communication circuit;

FIG. 4 shows a timing diagram illustrating the operation of the delay circuit.

BEST MODE FOR CARRYING OUT THE INVENTION

Figure 1:
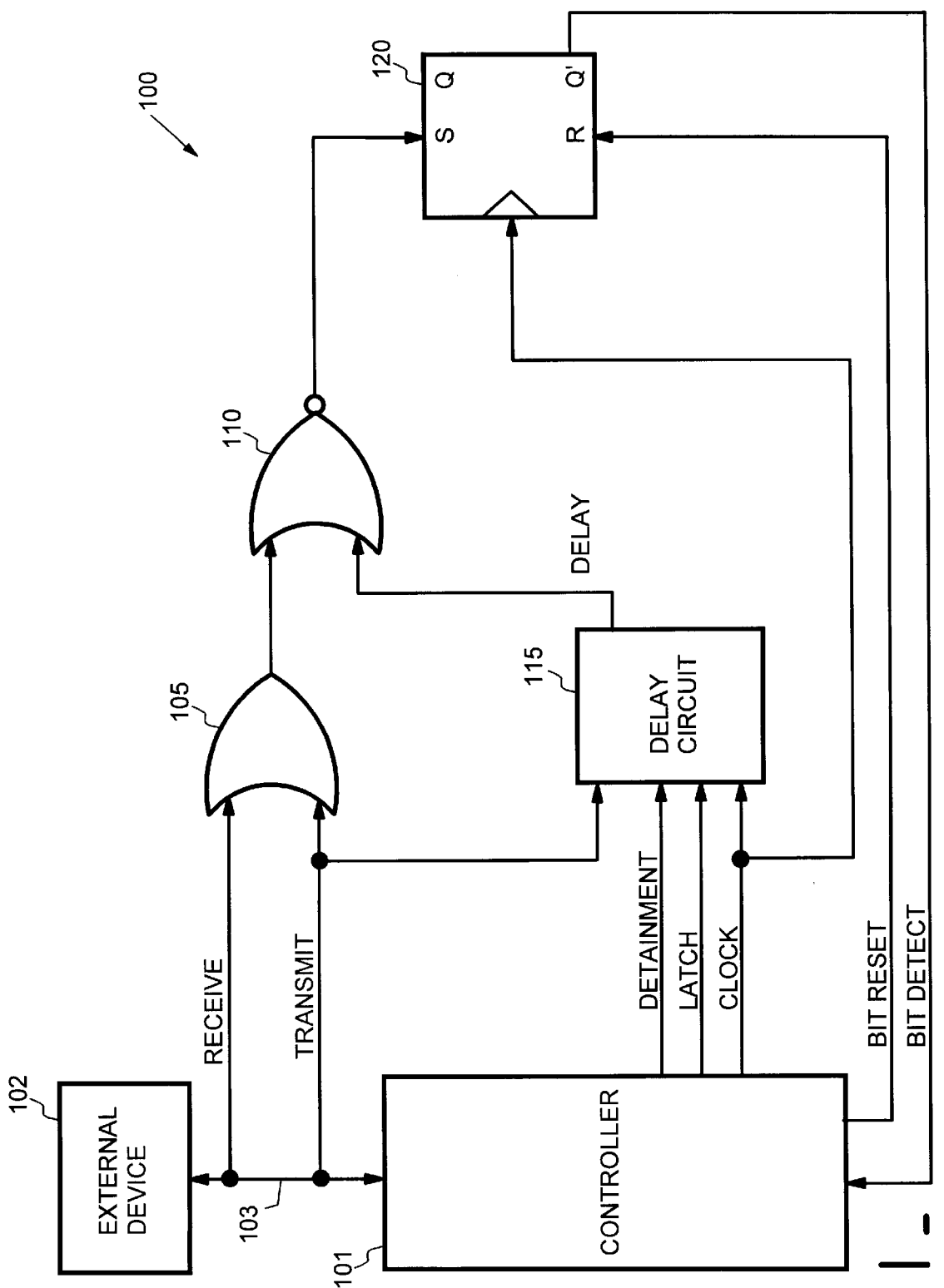
FIG. 1 shows a block diagram of a communication circuit.

Reference is now made to FIG. 1, which illustrates a digital communication circuit 100 associated with an embodiment of the present invention. Advantageously, the communication circuit 100 functions to avoid communication conflicts between a microprocessor based controller 101 and an external communication device 102 connected to each other via cable link 103. The digital communication circuit 100 includes an OR gate 105, which accepts a receive signal from the external communication device 102 and a transmit signal from the controller 101. The output of the OR gate 105 is connected to an input of a NOR gate 110. The other input of the NOR gate 110 is connected to an output of a programmable delay circuit 115, which will be described later. The output of the NOR gate 110 is connected to an S input of an S-R flip-flop 120. The R input and the Q' output of the S-R flip-flop 120 are connected to the controller 101. The S-R flip-flop 120 also receives a clocked input from the controller 101.

The purpose of the digital communication circuit 100 is to avoid communication conflicts between the controller 101 and the external communication device 102 by providing for two functions: (1) detecting when the external communication device 102 is transmitting data to the controller 101; and (2) delaying the detection of the communication from the external communication device 102 until the controller 101 has finished transmitting data to the external communication device 102. The first function is provided by the S-R flip-flop 120, while the second function is provided by the delay circuit 115.

The operation of the first function is best explained by the timing diagram shown on FIG. 2. Advantageously, the S-R flip-flop 120 produces a bit detect signal in response to the digital communication circuit 100 receiving a digital communication signal produced by the external communication device 102. The digital communication signal produced by the external communication device 102 is referred to as a receive signal. Note, for the purposes of this description, the receive signal is active "low"; while the transmit signal is active "high".

For example, once the receive and transmit signals are both "low", the OR gate 105 delivers a "low" output signal to the NOR gate 110.

In response to both input signals of the NOR gate 110 being "low", the NOR gate 110 delivers a "high" output signal to set the S-R flip-flop 120. Accordingly, the Q' output of the S-R flip-flop 120 produces the bit detect signal, which is represented by a "low" output signal. The bit detect signal is delivered to the controller 101 where the bit detect signal informs the controller 101 that an incoming message is being received from the external communication device 102. Once the incoming message has been processed, then the controller 101 produces a bit reset signal, which resets the S-R flip-flop 120. Thereafter, the controller 101 may then transmit data to the external communication device 102 without colliding with a receive signal. In this manner, the digital communication circuit 100 avoids communication conflicts by detecting when an incoming message is being received from the external communication device 102 so that the controller 101 can send information back to the external device after the incoming message has been completely processed.

Figure 3:
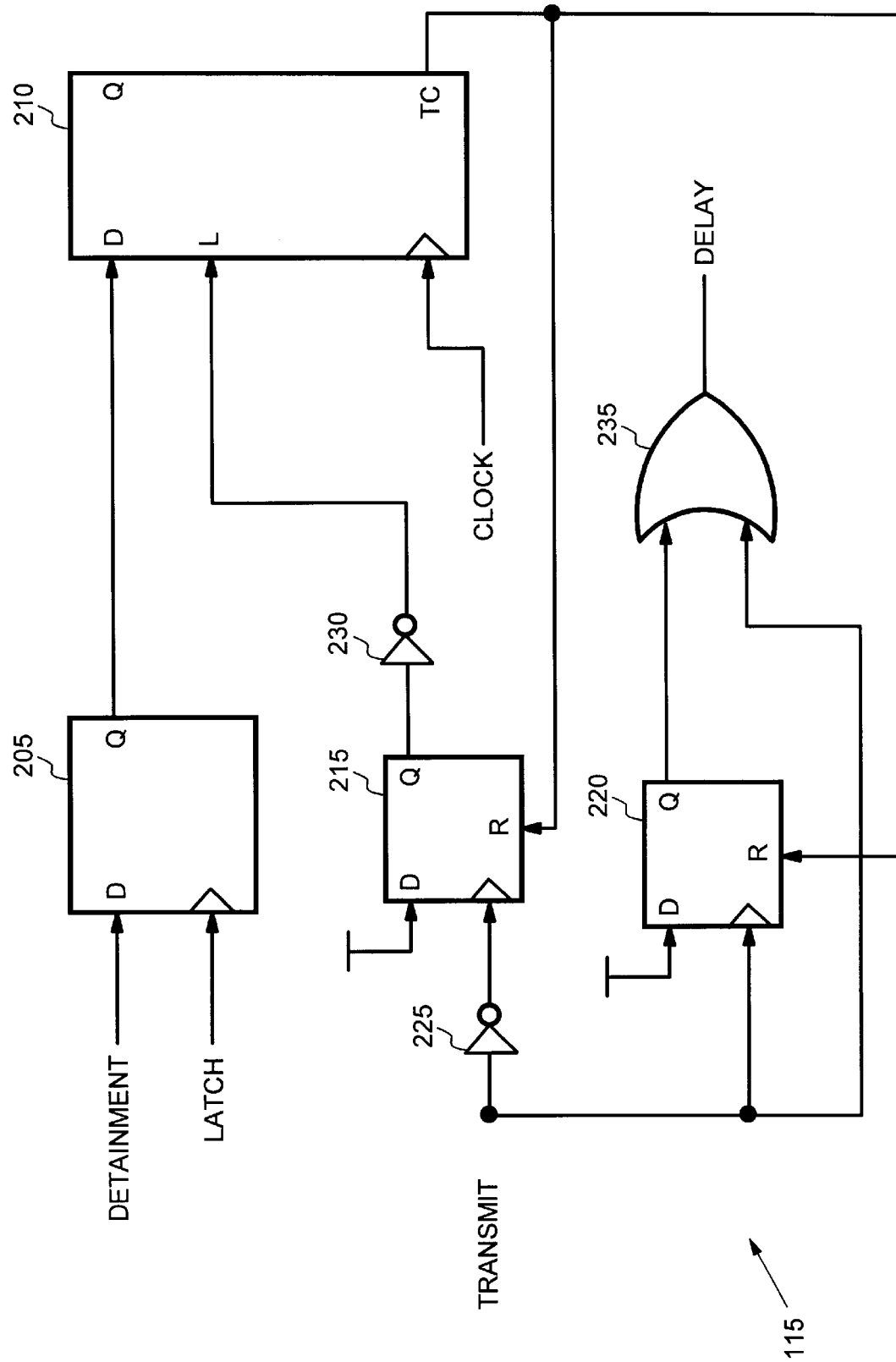
FIG. 3 shows a timing diagram illustrating the operation of the communication circuit.

Reference is now made to FIG. 3, where the delay circuit 115 is described. Advantageously, the delay circuit 115 delays detecting of the receive signal by a predetermined amount of time in response to the production of the transmit signal. Thus, the delay circuit 115 avoids false detections that are attributed to the transmit signal. More particularly, the delay circuit 115 provides the delay in response to a detainment signal from the controller 101. In the preferred embodiment, the detainment signal is a 4-bit word that is responsive to the RC time delay associated with the cable link 103. The value of the detainment signal is programmable is software.

As shown, the delay circuit 115 includes a register 205 that receives the detainment signal and a latch signal from the controller 101. The latch signal is responsible for latching the value of the delay signal in the register 205. The output of the register 205 is connected to a D input of a down counter 210. A first single-shot latch 215 receives an inverted transmit signal via inverter 225, while a second single-shot latch 220 receives the transmit signal. The Q output of the first single-shot latch 215 is connected to an L input of the down counter 210 via inverter 230.

Both the R inputs of the latches 215,220 are connected to a TC output of the down counter 210. Additionally, the D input of both latches 215,220 are "tied" high. Finally, the Q output of the second single-shot latch 220 is connected to an OR gate 235, which additionally receives the transmit signal.

As stated above, the function of the delay circuit 115 is to delay the detection of the receive signal until a predetermined amount of time after the production of the transmit signal. The predetermined amount of time is defined by the detainment signal. The delay is carried out by the down counter 210. For example, in response to the production of the transmit signal being complete, the down counter 210 counts down to zero starting with a value defined by the detainment signal. The completion of the transmit signal is signified by an initiate count signal, which is produced by the first latch 215, and is delivered to the L input of the down counter 210. Once the count has reached zero, then the down counter 210 produces a terminate count signal, which resets both latches 215,220. Consequently, once the second latch 220 resets, then the OR gate 235 ceases the production of the delay signal. As shown in FIG. 4, the delay signal provides for the "echo" to essentially be ignored by the detection circuit 120.

The operation of the delay circuit 115 may best be explained by the timing diagram shown in FIG. 4. In this example, the receive signal is indicative of an "echo" that is produced by the production of the transmit signal. As shown, the "echo" lags the transmit signal by a predetermined amount of time. This "lag" is due to the baud rate of the data transmission and load capacitance of the cable link 103.

The "low" to "high" transition of the transmit signal initiates the bit detection delay. However, the programmable portion of the delay is initiated by the "high" to "low" transition of the transmit signal. Consequently, the "high" to "low" transition of the transmit signal causes the first latch 215 to produce the initiate count signal, which causes the counter 220 to count down. Once the down count reaches zero, the counter 220 produces the terminate count signal, which resets the latches 215,220. Responsively, the second latch 220 produces a "low" output signal that causes the OR gate 235 to stop the production of the delay signal. Thus, as shown, the delay signal provides for the communication circuitry 100 to avoid detecting the "echo" produced by the transmit signal.

Thus, while the present invention has been particularly shown and described with reference to the preferred embodiment above, it will be understood by those skilled in the art that various additional embodiments may be contemplated without departing from the spirit and scope of the present invention.

We claim:

1. A digital communication circuit that avoids bit collisions between an external communication device and a controller, the controller being located within the digital communication circuit, that communicate to each other through a bi-directional serial communication link, comprising:

means for transmitting a first digital communication signal, said means also producing a detainment signal that is responsive to an RC time delay associated with the communication link;

means for receiving one of said first and a second digital communication signal, wherein said second signal is one of an echo of said first signal and an external signal produced by the external communication device;

means for detecting when one of said first and said second digital communication signals is being received; and delay means for receiving said first digital communication signal and said detainment signal and responsively delivering a delay signal to said detection means to delay the detection of said received digital communication signal.

2. A communication circuit, as set forth in claim 1, wherein the delay means receives the detainment signal and produces the delay signal for a predetermined amount of time after the production of the transmitted digital communication signal, the predetermined amount of time being responsive to the detainment signal.

3. A communication circuit, as set forth in claim 2, wherein the delay means includes:

a first single-shot latch that receives the transmitted digital communication signal and produces an initiate count signal in response to the completion of the transmitted digital communication signal;

a down counter that receives the initiate count signal, counts down to zero starting with a value defined by the detainment signal, and responsively produces a terminate count signal;

a second single-shot latch that receives the terminate court signal and responsively produces a logically low output signal; and an OR gate that receives the transmitted digital communication signal and the output signal and stops the production of the delay signal in response to the both the transmitted digital communication signal and the output signal being logically low.

4. A communication circuit, as set forth in claim 3, wherein the detecting means includes:

a NOR gate that receives the delay signal and the received digital communication signal and produces a set signal in response to the absence of the delay signal;

an S-R flip-flop that receives the set signal and produces a bit detect signal to inform the controller that an incoming message is being received from the external communication device, wherein the controller produces a bit reset signal to reset the S-R flip-flop upon processing the received digital communication signal.

5. A digital communication circuit that avoids bit collisions between an external communication device and a controller, the controller being located within the digital communication circuit, that communicate to each other through a bi-directional serial communication link, comprising:

means for transmitting a first digital communication signal, said means also producing a programmable detainment signal that is responsive to an RC time delay associated with the communication link;

means for receiving one of said first and a second digital communication signal, wherein said second signal is one of an echo of said first signal and an external signal produced by the external communication device;

means for detecting when one of said first and said second digital communication signals is being received; and delay means for receiving said first digital communication signal and said detainment signal and responsively delivering a delay signal to said detection means to delay the detection of said received digital communication signal.

6. A communication circuit, as set forth in claim 5, wherein the delay means receives the detainment signal and produces the delay signal for a predetermined amount of time after the production of the transmitted digital communication signal, the predetermined amount of time being responsive to the detainment signal.

7. A communication circuit, as set forth in claim 6, wherein the delay means includes:

a first single-shot latch that receives the transmitted digital communication signal and produces an initiate count signal in response to the completion of the transmitted digital communication signal;

a down counter that receives the initiate count signal, counts down to zero starting with a value defined by the detainment signal, and responsively produces a terminate count signal;

a second single-shot latch that receives the terminate court signal and responsively produces a logically low output signal; and an OR gate that receives the transmitted digital communication signal and the output signal and stops the production of the delay signal in response to the both the transmitted digital communication signal and the output signal being logically low.

8. A communication circuit, as set forth in claim 7, wherein the detecting means includes:

a NOR gate that receives the delay signal and the received digital communication signal and produces a set signal in response to the absence of the delay signal;

an S-R flip-flop that receives the set signal and produces a bit detect signal to inform the controller that an incoming message is being received from the external communication device, wherein the controller produces a bit reset signal to reset the S-R flip-flop upon processing the received digital communication signal.

* * * * *